US010302837B2

(12) United States Patent
Lee et al.

(10) Patent No.: US 10,302,837 B2
(45) Date of Patent: May 28, 2019

(54) BACKLIGHT UNIT AND LIQUID CRYSTAL DISPLAY INCLUDING THE SAME

(71) Applicant: Samsung Display Co., Ltd., Yongin (KR)

(72) Inventors: Sang Hyuk Lee, Anyang-si (KR); Jung Kyun Kim, Seoul (KR); Sang Chul Byun, Anyang-si (KR); Young Hye Son, Seoul (KR)

(73) Assignee: Samsung Display Co., Ltd, Yongin-si (KR)

( * ) Notice: Subject to any disclaimer, the term of this patent is extended or adjusted under 35 U.S.C. 154(b) by 541 days.

(21) Appl. No.: 14/669,464

(22) Filed: Mar. 26, 2015

(65) Prior Publication Data

US 2016/0109635 A1    Apr. 21, 2016

(30) Foreign Application Priority Data

Oct. 16, 2014  (KR) ........................ 10-2014-0140024

(51) Int. Cl.
*F21V 8/00* (2006.01)
*G02F 1/1335* (2006.01)

(52) U.S. Cl.
CPC ........... *G02B 6/0026* (2013.01); *G02B 6/009* (2013.01); *G02B 6/0013* (2013.01); *G02B 6/0025* (2013.01); *G02B 6/0083* (2013.01); *G02B 6/0088* (2013.01); *G02F 1/133615* (2013.01); *G02B 6/0036* (2013.01); *G02B 6/0051* (2013.01); *G02B 6/0055* (2013.01); *G02B 6/0093* (2013.01)

(58) Field of Classification Search
CPC ................................................ G02F 1/133615
See application file for complete search history.

(56) References Cited

U.S. PATENT DOCUMENTS

2008/0136994 A1*  6/2008  Lee ................... G02F 1/133604
                                                            349/58
2010/0283914 A1* 11/2010  Hamada ............... G02B 6/0026
                                                            348/731

(Continued)

FOREIGN PATENT DOCUMENTS

KR   10-2008-0048334    6/2008
KR   10-2012-0105518    9/2012

(Continued)

*Primary Examiner* — Nathanael R Briggs
*Assistant Examiner* — Alexander P Gross
(74) *Attorney, Agent, or Firm* — H.C. Park & Associates, PLC (57) ABSTRACT

A backlight unit including a light guide plate (LGP), a light source module disposed adjacent to an incident surface of the LGP and configured to irradiate light to the incident surface, and a light control member disposed between the light source module and the incident surface, in which the light control member includes a reflection preventing layer disposed adjacent to the light source module and configured to prevent reflection of light, a base substrate disposed on the reflection preventing layer and configured to scatter or diffuse light transmitted through the reflection preventing layer, and a light adjusting filter disposed on the base substrate and configured to filter light including a first wavelength among light provided by the light source module.

20 Claims, 8 Drawing Sheets

(56) References Cited

U.S. PATENT DOCUMENTS

| | | | | |
|---|---|---|---|---|
| 2014/0002771 A1* | 1/2014 | Huang | ............. | G02F 1/133615 |
| | | | | 349/64 |
| 2014/0029298 A1* | 1/2014 | Hyun | ................ | G02B 6/0003 |
| | | | | 362/608 |
| 2014/0368769 A1* | 12/2014 | Lee | ................ | G02B 6/0068 |
| | | | | 349/65 |
| 2016/0161657 A1* | 6/2016 | Yamada | ............. | G02B 6/005 |
| | | | | 349/62 |

FOREIGN PATENT DOCUMENTS

| | | |
|---|---|---|
| KR | 10-2013-0009021 | 1/2013 |
| KR | 10-2013-0010372 | 1/2013 |

\* cited by examiner

BACKLIGHT UNIT AND LIQUID CRYSTAL DISPLAY INCLUDING THE SAME

CROSS-REFERENCE TO RELATED APPLICATION

This application claims priority from and the benefit of Korean Patent Application No. 10-2014-0140024, filed on Oct. 16, 2014, which is hereby incorporated by reference for all purposes as if fully set forth herein.

BACKGROUND

Field

Exemplary embodiments of the present invention relate to a backlight unit and a liquid crystal display (LCD) including the same.

Discussion of the Background

Conventional displays are being replaced by thin flat panel displays such as liquid crystal displays (LCDs) and organic light-emitting diodes (OLEDs).

An LCD may include a liquid crystal panel having liquid crystals injected between a thin-film transistor (TFT) substrate and a color filter substrate. Since the LCD may not emit light by itself, a backlight unit for supplying light may be located behind the TFT substrate. Transmittance of light emitted from the backlight unit may be adjusted by the arrangement of the liquid crystals.

Backlight units may be classified into direct-illumination type and edge-illumination type according to the position of a light source. In an edge-illumination type backlight unit, a light source may be disposed on a side of a light guide plate (LGP). The edge-illumination type backlight unit may be used for relatively small-sized LCDs, such as laptop computers and notebook computers. The edge-illumination type backlight unit may provide uniform light, have a long useful life, and be advantageous for making LCDs thinner.

When a light-emitting diode (LED) (i.e., a point light source) is used as the light source of the edge-illumination type backlight unit, a hot spot (i.e., a bright portion) may be created on a portion of a liquid crystal panel due to characteristics of the point light source. In particular, the hot spot may occur when light emitted from the light source forms a bright portion on the liquid crystal panel, and an area around the bright portion may appear dark (a dark portion). The bright or dark portions of the hot spot may degrade the quality of a display device.

In addition, while the LED is placed on a side of the LGP to emit light toward the LGP, part of the emitted light may leak, that is, may fail to enter the LGP.

In particular, when an LED emitting white light is used as the light source, a hot spot may be created on the liquid crystal panel, and the hot spot may make the luminance of the LCD non-uniform.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a backlight unit which may improve light efficiency and provide uniform luminance.

Exemplary embodiments of the present invention also provide a liquid crystal display (LCD) which may improve color reproducibility by absorbing or reflecting light of a particular wavelength.

Additional aspects will be set forth in the detailed description which follows, and, in part, will be apparent from the disclosure, or may be learned by practice of the inventive concept.

According to an exemplary embodiment of the present invention, a backlight unit includes a light guide plate (LGP), a light source module disposed adjacent to an incident surface of the LGP and configured to irradiate light to the incident surface, and a light control member disposed between the light source module and the incident surface, in which the light control member includes a reflection preventing layer disposed adjacent to the light source module and configured to prevent reflection of light, a base substrate disposed on the reflection preventing layer and configured to scatter or diffuse light transmitted through the reflection preventing layer, and a light adjusting filter disposed on the base substrate and configured to filter light including a first wavelength among light provided by the light source module.

The light control member may include a reflection preventing layer disposed adjacent to the light source module, a base substrate disposed adjacent to the LGP, and a light adjusting filter disposed between the reflection preventing layer and the base substrate.

The light control member may further include an adhesive layer contacting the light source module and the incident surface of the LGP.

The reflection preventing layer may include a reflectivity in a range of 0.1% to 1%.

The base substrate may further include diffuser beads.

The base substrate may include layers having different refractive indices from each other and disposed on the reflection preventing layer.

The base substrate may include layers having different refractive indices from each other, and the layers are disposed on the reflection preventing layer such that the refractive indices of the layers gradually increase in a direction from the light source module towards the LGP.

A first layer of the layers disposed adjacent to the LGP may have a refractive index substantially equal to a refractive index of the LGP or different from the refractive index of the LGP by less than 0.1.

The base substrate may include glass, quartz, polymethyl methacrylate (PMMA), or polycarbonate (PC).

The light adjusting filter may be configured to minimize transmittance of light having the first wavelength.

The light adjusting filter may include a reflective mirror configured to reflect the first wavelength or an absorption filter configured to absorb the first wavelength.

The light adjusting filter may be configured to absorb or reflect light having the first wavelength in a range of 470 nm to 510 nm.

The light adjusting filter may be configured to absorb or reflect light having the first wavelength in a range of 560 nm to 610 nm.

The backlight unit may further include a lower housing including a bottom plate, sidewalls protruding upward from the bottom plate, and a top plate partially protruding from the sidewalls to be parallel to the bottom plate, and a reflective sheet disposed between the LGP and the lower housing, in which the bottom plate of the lower housing forms a space for housing the LGP, the light control member, and the light source module including a printed circuit board (PCB) and light source packages.

The light control member may be disposed on the PCB.

The light control member may be disposed on the lower housing.

The PCB may include a mounting surface on which the light source packages are disposed, and a resting surface opposite to the mounting surface and disposed on a sidewall or the bottom plate of the lower housing.

According an exemplary embodiment of the present invention, a backlight unit includes a light source module having a front surface configured to radiate light, an LGP having an incident surface upon which the light radiated from the front surface of the light source module is configured to be incident, and a light control member disposed between the front surface of the light source module and the incident surface of the LGP, in which the light control member contacts the front surface of the light source module and the incident surface of the LGP.

The light control member may include a reflection preventing layer, a base substrate, and a light adjusting filter, in which the reflection preventing layer contacts the front surface of the light source module, and the light adjusting filter or the base substrate contacts the incident surface of the LGP.

According to an exemplary embodiment of the present invention, an LCD includes a backlight unit including an LGP, a light source module disposed adjacent to an incident surface of the LGP and configured to irradiate light to the incident surface, and a light control member disposed between the light source module and the incident surface, and a liquid crystal panel disposed on the LGP, in which the light control member includes a reflection preventing layer disposed adjacent to the light source module and configured to prevent reflection of light, a base substrate disposed on the reflection preventing layer and configured to scatter or diffuse light transmitted through the reflection preventing layer; and a light adjusting filter disposed on the base substrate and configured to filter light including a first wavelength among light provided by the light source module.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
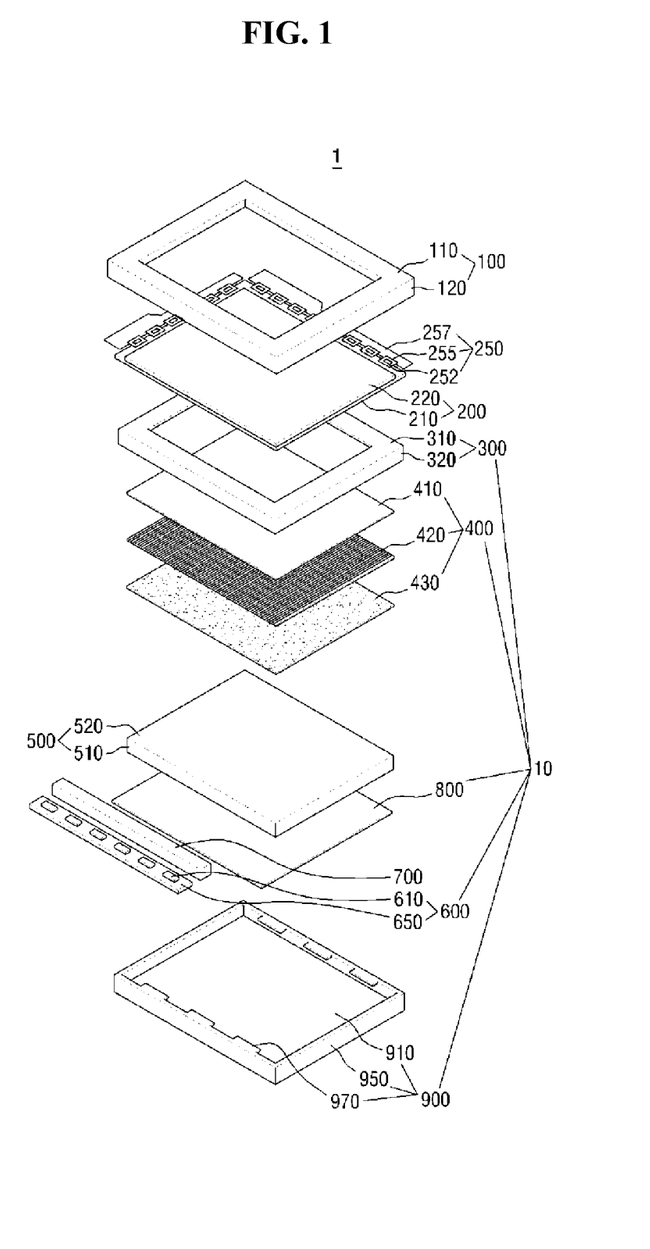
FIG. 1 is a view of a backlight unit and a liquid crystal display (LCD) including the same according to an exemplary embodiment of the present invention.
Figure 2:
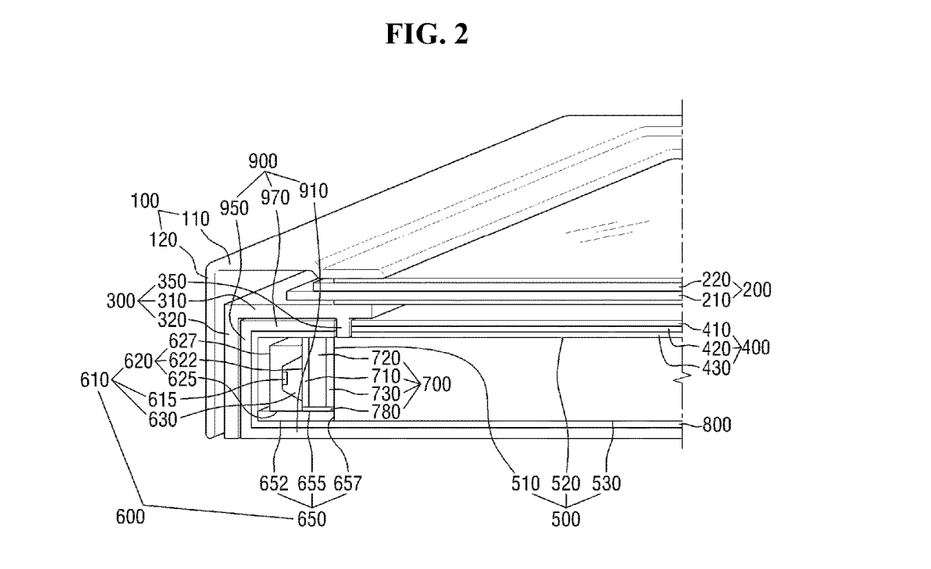
FIG. 2 is a cross-sectional view of a side of the backlight unit and the LCD including the same illustrated in FIG. 1.

FIG. 1 is an exploded perspective view of a backlight unit 10 and a liquid crystal display (LCD) 1 including the same according to an exemplary embodiment of the present invention. FIG. 2 is a cross-sectional view of a side of the backlight unit 10 and the LCD 1 including the same illustrated in FIG. 1.

Referring to FIGS. 1 and 2, the LCD 1 according to the present exemplary embodiment may include a liquid crystal panel 200, the backlight unit 10, and an upper housing 100. The liquid crystal panel 200 may receive light from the backlight unit 10 and display an image by adjusting the arrangement of liquid crystals to refract light in different patterns.

The liquid crystal panel 200 may include a thin-film transistor (TFT) substrate 210 having TFTs, a color filter substrate 220 facing the TFT substrate 210, and a liquid crystal layer (not illustrated) interposed between the TFT substrate 210 and the color filter substrate 220.

The LCD 1 may further include a driver 250 which adjusts the arrangement of liquid crystals of the liquid crystal layer. The driver 250 may include a flexible printed circuit board (FPC) 252, driver chips 255 mounted on the FPC 252, and a printed circuit board (PCB) 257 connected to a side of the FPC 252. The driver 250 may be a chip-on-film (COF) type. Alternatively, the driver 250 may be a taper carrier package (TCP) or a chip-on-glass (COG) types. In addition, all or part of the driver 250 may be mounted on the TFT substrate 210.

The upper housing 100 may include a frame 110 which covers edges of the liquid crystal panel 200 and sidewalls 120 which extend from outer edges of the frame 120 toward a lower housing 900. An area of the liquid crystal panel 200, excluding an area covered with the frame 110 of the upper housing 100, may be an active area in which an image is displayed. An opening may be formed in the upper housing 100 to expose the active area.

The backlight unit 10 may be placed behind the liquid crystal panel 200. The backlight unit 10 may include optical films 400, a light guide plate (LGP) 500, a light source module 600, a reflective sheet 800, a light control member 700, the lower housing 900, and a middle frame 300.

The lower housing 900 may include a space for housing the LGP 500, the light source module 600, and the reflective sheet 800. The lower housing 900 may include a bottom plate 910 and sidewalls 950 which protrude upward from edges of the bottom plate 910. In addition, the lower housing 900 may include a top plate 970 which partially protrudes from the sidewalls 950 to be parallel to the bottom plate 910.

The reflective sheet 800 may be placed within the lower housing 900. For example, the reflective sheet 800 may be placed along the inside of the bottom plate 910, the sidewalls 950, and the top plate 970 of the lower housing 900. Alternatively, the reflective sheet 800 may be placed only on an inner surface of the bottom plate 910 of the lower housing 900. Referring to FIG. 1, the reflective sheet 800 is placed along the inside of the bottom plate 910, the sidewalls 950, and the top plate 970.

The reflective sheet 800 may be disposed under the LGP 500 to guide light leaking from a lower surface 530 of the LGP 500 back to the LGP 500. The reflective sheet 800 disposed behind the lower surface 530 of the LGP 500 may be made of a plastic material or a reflective metal.

The light source module 600 may be placed along a sidewall 950 of the lower housing 900 in a space formed by the overlap of the bottom plate 910 and the top plate 970 of the lower housing 900. The light source module 600 may include light source packages 610, and a PCB 650.

Each of the light source packages 610 may include a light source 615, a mold 620 which houses the light source 615, and a molding material 630 which encapsulates the mold 620.

The light source 615 may be a fluorescent lamp or a light-emitting device. The light-emitting device may be a light-emitting diode (LED), an inorganic electroluminescent (EL) device, or an organic EL device. According to the present exemplary embodiment, the light source 615 may be an LED.

The mold 620 may include a front surface 622 disposed in the direction that light is radiated from the light source 615, a rear surface 627 that is opposite to the front surface 622, and side surfaces 625 that connect the rear surface 627 and the front surface 622. The mold 620 may include a recessed portion in the front surface 622. The recessed portion is a space in which the light source 615 may be accommodated, and the light source 615 may be placed in the recessed portion. Since the light source 615 may be placed in the recessed portion of the mold 620, light may be radiated toward the front surface 622 of the mold 620.

The recessed portion may be filled with the molding material 630. The molding material 630 may protect the light source 615 from an external environment. The molding material 630 may include a phosphorescent or fluorescent material. Accordingly, each of the light source packages 610 may emit light of a desired color by passing light emitted from the light source 615 through the molding material 630. For example, the color of light emitted from the light source 615 and the color of the phosphorescent or fluorescent material of the molding material 630 may complement each other to provide white light. In another example, a red LED, a green LED, and a blue LED may be arranged such that red light emitted from the red LED, green light emitted from the green LED, and blue light emitted from the blue LED are mixed to provide white light.

The light source packages 610 may be arranged on the PCB 650 at regular intervals. The PCB 650 may transmit an electrical signal to each of the light source packages 610. The PCB 650 may be placed adjacent to a sidewall 950 of the lower housing 900 and parallel to the bottom plate 910 of the lower housing 900. Specifically, a resting surface 652 (i.e., a lower surface) of the PCB 650 may be placed on the reflective sheet 800 disposed on an inner surface of the lower housing 900.

A mounting surface 655 may be disposed on an opposite side of the resting surface 652 of the PCB 650. Side surfaces 657 may be formed between the resting surface 652 and the mounting surface 655 along a long axis of the PCB 650. One of the side surfaces 657 of the PCB 650 may be placed adjacent to or brought into close contact with a sidewall 950 of the lower housing 900. The other one of the side surfaces 657 of the PCB 650 may be placed adjacent to or brought into close contact with an incident surface 510 of the LGP 500.

The light source packages 610 may be mounted on the mounting surface 655 of the PCB 650. A side surface 625 of the mold 620 may be mounted on the mounting surface 655. The front surface 622 of the mold 620 may be placed to face the incident surface 510 of the LGP 500.

The LGP 500 may guide light supplied from the light source module 600 towards the liquid crystal panel 200. The LGP 500 may be placed behind the liquid crystal panel 200. Specifically, the LGP 500 may be placed between the liquid crystal panel 200 and the reflective sheet 800.

The LGP 500 may include the incident surface 510 (i.e., a side surface) upon which light emitted from the light source module 600 is incident, an upper surface 520 that faces the liquid crystal panel 200, and the lower surface 530 that is disposed opposite to the upper surface 520 and faces the reflective sheet 800. Here, the upper surface 520 of the LGP 500 may be an exit surface that provides light to the liquid crystal panel 200. Scattering patterns (not illustrated) may be disposed on the lower surface 530 of the LGP 500 to reflect light toward the upper surface 520 of the LGP 500. The scattering patterns may scatter light remaining in the LGP 500 to change the path of the light such that the light is output toward the upper surface 520 of the LGP 500.

The light source module 600 may be placed side by side with the incident surface 510 of the LGP 500. The light source module 600 may be placed in various ways according to the shape of the LGP 500. For example, if the LGP 500 is wedge-shaped and the incident surface 510 is defined in only one side surface of the LGP 500, the light source module 600 may be placed on only one side of the LGP 500. If the LGP 500 is flat plate shaped having the incident surface 510 defined in both side surfaces thereof, the light source module 600 may be placed on left and right sides of the LGP 500. Alternatively, the light source module 600 may be placed on only one side of the flat LGP 500, as illustrated in FIG. 2.

The LGP 500 may include material having light-transmitting properties, such as glass, quartz, or polymer, in order to effectively guide light. The polymer may include acrylic resin such as polymethyl methacrylate (PMMA) or material having a certain refractive index, such as polycarbonate (PC).

The light control member 700 may be placed between the light source module 600 and the LGP 500. The light control member 700 may extend along the incident surface 510 of the LGP 500. Specifically, the light control member 700 may be placed between the front surface 622 of the mold 620 of each of the light source packages 610 and the incident surface 510 of the LGP 500. The light control member 700 will be described in detail later.

The optical films 400 may be disposed between the upper surface 520 of the LGP 500 and the liquid crystal panel 200. The optical films 400 may include a protective film 410, a collimating film 420, and a diffusion film 430.

The diffusion film 430 may diffuse light received from the light source module 600 and provide the diffused light to the liquid crystal panel 200. The diffusion film 430 may scatter or diffuse light in order to prevent a bright or dark portion existing in the backlight unit 10 behind the liquid crystal panel 200 from being projected on the liquid crystal panel 200.

The collimating film 420 may collimate light diffused by the diffusion film 430 in a direction perpendicular to a plane of the liquid crystal panel 200 disposed there above. The collimating film 420 may consist of triangular prism patterns (not illustrated) arranged at regular intervals on an upper surface of a base substrate. The collimating film 420 may be formed in two sheets, and include micro-prism patterns arranged orthogonal to each other. Light that passes through the collimating film 420 may propagate in a substantially vertical direction with respect to the collimating film 420, thereby providing uniform luminance.

The protective film 410 may be located at the top of the optical films 400 and protect the micro-prism patterns of the collimating film 420 which may be vulnerable to scratches such as dust. The protective film 410 may be disposed on the collimating film 420.

The middle frame 300 may be disposed between the lower housing 900 and the upper housing 100 to support and fix the optical films 400. The middle frame 300 may include sidewalls 320, which are coupled to the sidewalls 950 of the lower housing 900, a support portion 310, which protrudes from the sidewalls 320 of the middle frame 300 and placed on the top plate 970 of the lower housing 900, and a fixing portion 350, which extends from the support portion 310 to overlap the LGP 500 and fixes the LGP 500 by pressing the LGP 500. The fixing portion 350 may support and fix the LGP 500 by pressing edges of the upper surface 520 of the LGP 500.

The light control member 700 will now be described in more detail.

When the light source packages 610 are mounted on the mounting surface 655 of the PCB 650, the light source packages 610 may be placed in the middle of the PCB 650 along a short axis, such that they may be more easily mounted on the PCB 650. In addition, a lower part of the incident surface 510 of the LGP 500 may be brought into close contact with a side surface 657 of the PCB 650. Therefore, a gap may be formed between the incident surface 510 of the LGP 500 and the front (i.e., upper) surface 622 of the mold 620. Due to the gap, optical interfaces having different refractive indices may be formed. The optical interfaces may reduce the amount of light provided to the incident surface 510 of the LGP 500.

Specifically, light emitted from the light source module 600 may pass through interfaces having different refractive indices. For example, light emitted from the light source 615 may pass through the molding material 630, an air layer, and the LGP 500. The light may be refracted at an interface between the molding material 630 and the air layer, and at an interface between the air layer and the LGP 500. As the difference between refractive indices of the interfaces increases, the light may be refracted to a greater degree. In addition, as the gap composed of the air layer is wider, the light refracted toward the outside may travel a longer distance within the air layer. Accordingly, this may increase the amount of light failing to enter the incident surface 510 of the LGP 500.

The light control member 700 may reduce the amount of light leaked due to refraction and reflection at the interfaces. The light control member 700 may be coupled onto the mounting surface 655 of the PCB 650, which is exposed by the gap. For example, an adhesive layer 780 may be formed on the mounting surface 655 of the PCB 650, and the light control member 700 may be supported by or fixed to the mounting surface 655 by the adhesive layer 780. A side surface of the light control member 700 may be in close contact with the front surface 622 of the mold 620, and the other side surface of the light control member 700 may be in close contact with the incident surface 510 of the LGP 500.

The light control member 700 placed between the light source packages 610 and the incident surface 510 of the LGP 500 may eliminate or reduce the gap composed of the air layer between the light source module 600 and the LGP 500. Therefore, the path of refracted light entering the air layer from the light source module 600 and travelling toward the outside may be eliminated or reduced. Accordingly, the light control member 700 may reduce the amount of light leaking toward the outside of the incident surface 510 of the LGP 500.

Further, when the light control member 700 completely fills the gap, an optical interface may be formed between the light source module 600 and the light control member 700, and between the light control member 700 and the incident surface 510 of the LGP 500. In this case, a difference between refractive indices of the optical interfaces may be reduced by adjusting a refractive index of the light control member 700. Accordingly, the light control member 700 may further reduce the amount of light leaked after being reflected at the optical interfaces.

Therefore, when the gap is eliminated or reduced by placing the light control member 700 between the front surface 622 of the mold 620 of each of the light source packages 610 and the incident surface 510 of the LGP 500, the amount of light provided to the incident surface 510 of the LGP 500 may be increased.

The light control member 700 may include a reflection preventing layer 710 disposed adjacent to the light source module 600 and configured to prevent reflection of emitted light, a base substrate 720 disposed on the reflection preventing layer 710 and configured to scatter or diffuse light transmitting through the reflection preventing layer 710, and a light adjusting filter 730 disposed on the base substrate 720 and configured to filter out a particular wavelength of the scattered or diffused light.

The reflection preventing layer 710 may be disposed adjacent to the light source packages 610 of the light source module 600. The reflection preventing layer 710 may prevent reflection of light emitted from the light source 615 such that the light may enter the light control member 700. The reflection preventing layer 710 may be a coating layer having a reflectivity in a range of 0.1% to 1%. The reflection preventing layer 710 disposed adjacent to the light source module 600 may prevent the leakage of light by preventing the reflection of light and improve light efficiency by increasing the amount of light provided to the LGP 500.

The base substrate 720 may be disposed on the reflection preventing layer 710 to scatter or diffuse light that transmits through the reflection preventing layer 710. The base substrate 720 may provide light with uniform luminance to the incident surface 510 of the LGP 500. When the light source packages 610 is mounted on the PCB 650, the light source packages 610 may be slanted respect to the PCB 650. When the slanted light source packages 610 are disposed on a side of the LGP 500 to emit light toward the incident surface 510 of the LGP 500, the light emitted from the slanted light source packages 610 may enter the LGP 500 in a direction (e.g., toward the upper surface 520, the lower surface 530, or a side surface) oblique to the incident surface 510 of the LGP 500. The light entering the LGP 500 in the direction oblique to the incident surface 510 may form a hot spot (bright and dark portions) in the LCD 1. The base substrate 710 may scatter or diffuse light that may form a hot spot. Therefore, the base substrate 710 that scatters or diffuses light may provide light with uniform luminance to the LGP 500.

The base substrate 720 may use a material having a refractive index in a range of 1.1 to 1.5. The base substrate 720 may use one of quartz, glass, polymer, and a mixture thereof. The base substrate 720 using glass may withstand heat generated from the light source 615. The base substrate 720 using glass may withstand thermal shock because the glass may not be softened or deformed at high temperature and hardly expands thermally. Therefore, the base substrate 720 using glass may protect the LGP 500 from thermal shock.

The light control member 700 may include the light adjusting filter 730 disposed on the base substrate 720. The light adjusting filter 730 may filter out light of a particular wavelength. The light adjusting filter 730 may minimize transmittance of a particular wavelength and transmit other wavelengths.

The light adjusting filter 730 may minimize transmittance of a wavelength in a particular range. The light adjusting filter 730 may be a dichroic filter or a dichroic mirror. The dichroic filter may minimize transmittance of a particular wavelength by absorbing the particular wavelength. The dichroic mirror may minimize transmittance of a particular wavelength by reflecting the particular wavelength and reduce light loss by changing the phase of the reflected wavelength and reusing the reflected wavelength with the changed phase.

Placing the light control member 700 in the gap between the incident surface 510 of the LGP 500 and the light source packages 610 may improve the light efficiency and color reproducibility of the backlight unit 10 and the LCD 1.

Figure 3A:
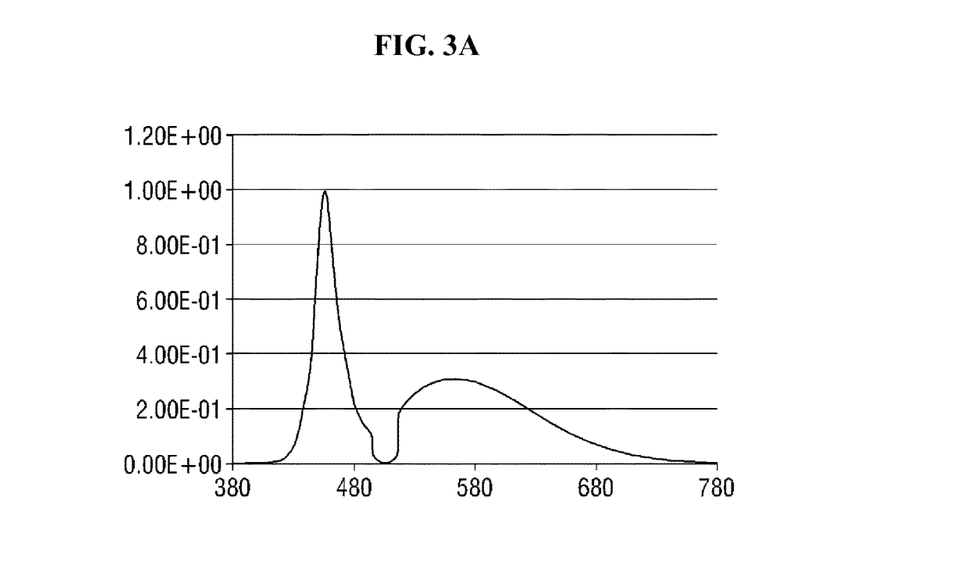
FIGS. 3A and 3B are graphs illustrating wavelengths of light provided by the backlight unit of FIG. 1.
Figure 3B:
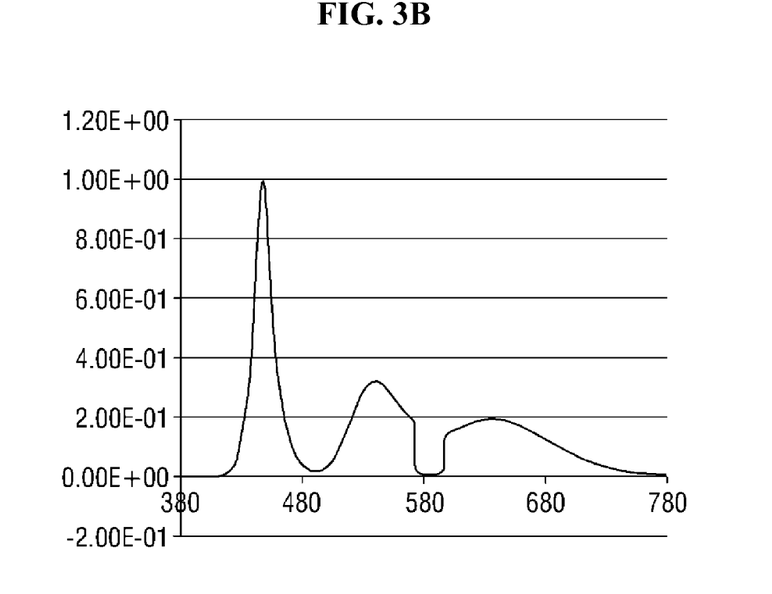

FIGS. 3A and 3B are graphs illustrating wavelengths of light provided by the backlight unit 10 of FIG. 1.

Referring to FIGS. 3A and 3B, the light control member 700 may receive white light from the light source module 600. The light control member 700 may include the light adjusting filter 730 configured to minimize transmittance of light having a particular wavelength by reflecting or absorbing the light having the particular wavelength. The light control member 700 including the light adjusting filter 730 may be placed along the incident surface 510 of the LGP 500.

The light adjusting filter 730 of the light control member 700 may minimize transmittance of light having a particular wavelength among the white light by reflecting or absorbing the light having the particular wavelength. Specifically, the light adjusting filter 730 of the light control member 700 may minimize transmittance of light in a wavelength range that degrades color reproducibility by reflecting or absorbing the light.

Referring to FIG. 3A, the light adjusting filter 730 may minimize transmittance of light in a wavelength range of 470 nm to 510 nm, which is a wavelength range of greenish blue formed between blue and green. Referring to FIG. 3B, the light adjusting filter 730 may minimize transmittance of light in a wavelength range of 560 nm to 610 nm, which is a wavelength range of yellowish green formed between green and yellow. The light adjusting filter 730 may be a filter that minimizes transmittances of both greenish blue and yellowish green in the above wavelength ranges. Alternatively, the light adjusting filter 730 may be a combination of filters that may minimize transmittances of both greenish blue and yellowish green in the above wavelength ranges.

Color clarity may be reduced as colors in the above wavelength ranges (470 nm to 510 nm, and 560 nm to 610 nm) are mixed with other colors, and the reduced color clarity may reduce color reproducibility. However, the light adjusting filter 730 may minimize transmittance of light in a wavelength range that reduces color reproducibility by reflecting or absorbing the light. The light adjusting filter 730 may be installed on the incident surface 510 of the LGP 500 rather than on the upper surface 520 of the LGP 500 to reduce manufacturing cost, since the area of the incident surface 510 of the LGP is smaller than that of the upper surface 520. Further, since light is filtered (i.e., reflected or absorbed) over the small area of the incident surface 510 rather than over a large area, a reduction in luminance may be prevented while light efficiency is improved.

Light control members 700 according to exemplary embodiments of the present invention will now be described in detail with reference to FIG. 4, FIG. 5, FIG. 6, FIG. 7, and FIG. 8.

Figure 4:
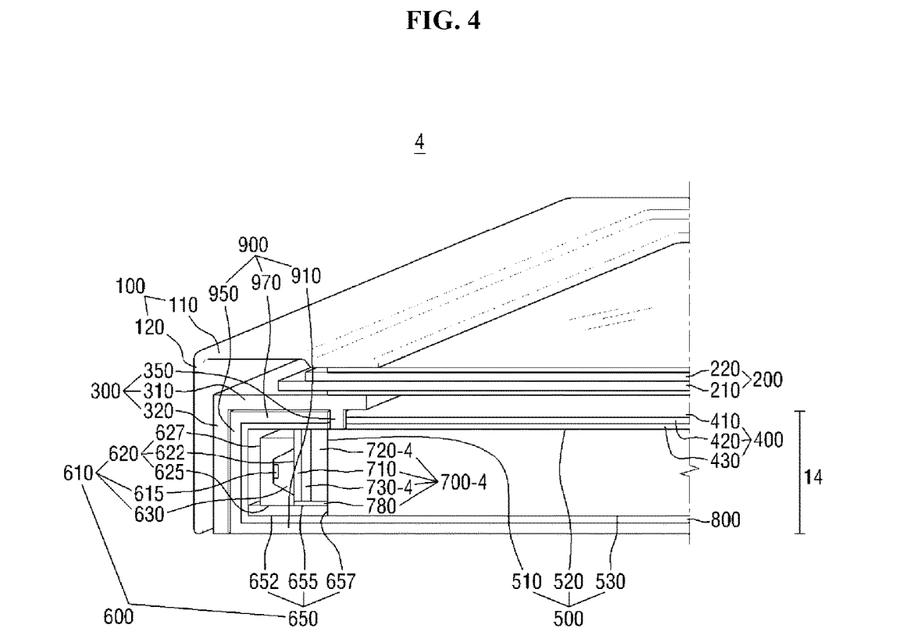
FIG. 4 is a cross-sectional view of a side of an LCD including a backlight unit according to an exemplary embodiment of the present invention.

FIG. 4 is a cross-sectional view of a side of an LCD 4 including a backlight unit 14 according to an exemplary embodiment of the present invention.

Referring to FIG. 4, the LCD 4 may include a liquid crystal panel 200, an upper housing 100, and the backlight unit 14.

The liquid crystal panel 200 and the upper housing 100 may be substantially similar to those of the LCD 1 including the backlight unit 10, and repeated description of the substantially similar elements and operations illustrated above with reference to FIGS. 1 and 2 will be omitted. The backlight unit 14 according to the present exemplary embodiment includes a lower housing 900, a middle frame 300, optical films 400, an LGP 500, a reflective sheet 800, and a light source module 600, which may be substantially the same to those of the backlight unit 10 illustrated with reference to FIGS. 1 and 2, and repeated description of the substantially similar elements and operations illustrated with reference to FIGS. 1 and 2 will be omitted.

A light control member 700-4 may be placed between the light source module 600 and the LGP 500. According to the present exemplary embodiment, the light control member 700-4 may sequentially include a reflection preventing layer 710, a light adjusting filter 730-4, and a base substrate 720-4. That is, the reflection preventing layer 710 may be disposed adjacent to the light source module 600, the light adjusting filter 730-4 may be disposed between the reflection preventing layer 710 and the base substrate 720-4, and the base substrate 720-4 may be disposed adjacent to an incident surface 510 of the LGP.

The reflection preventing layer 710 in close contact with the light source module 600 may increase the luminance of the backlight unit 14 by preventing reflection of light emitted from a light source 615.

The light adjusting filter 730-4 may be disposed on the reflection preventing layer 710. The light adjusting filter 730-4 may minimize transmittance of light having a particular wavelength by reflecting or absorbing the light, thereby improving color reproducibility. Since the light adjusting filter 730-4 may minimize transmittance of light in a particular wavelength range by reflecting or absorbing the light, the luminance of the backlight unit 14 may be reduced.

In the light control member 700-4, the base substrate 720-4 which may provide light with uniform luminance, may be disposed on the light adjusting filter 730-4. The base substrate 720-4 may scatter or diffuse the light having a particular wavelength that was filtered out by the light adjusting filter 730-4. As the filtered light is scattered or diffused by the base substrate 720-4, light may have uniform luminance. The light with uniform luminance may then be provided to the incident surface 510 of the LGP 500.

As described above, light emitted from the light source module 600 may be filtered by the light adjusting filter 730-4, and the filtered light may be scattered or diffused by the base substrate 720-4. Accordingly, light with uniform luminance may be provided to the incident surface 510 of the LGP 500, thus minimizing a reduction in luminance.

Since the light adjusting filter 730-4 may filter out light of a particular wavelength and the base substrate 720-4 may scatter or diffuse filtered light, the luminance loss of the LCD 4 including the backlight unit 14 may be reduced while color reproducibility is improved.

Figure 5:
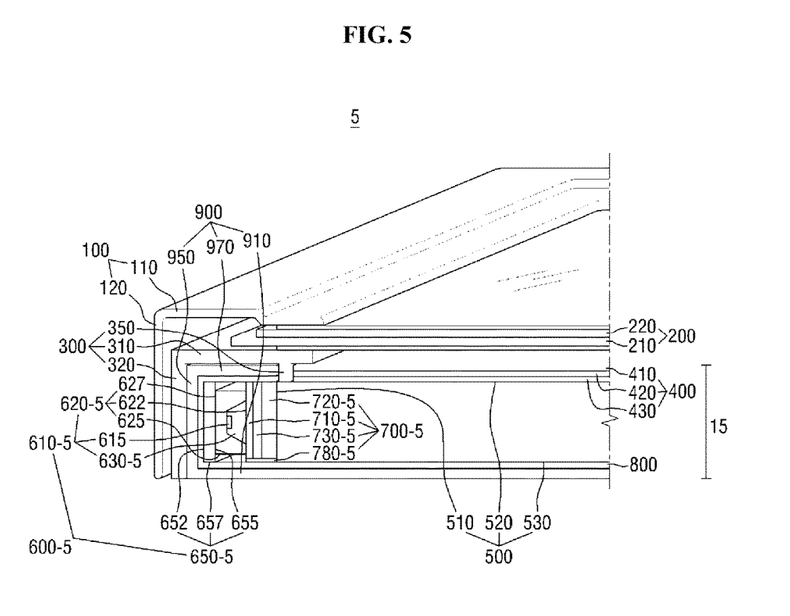
FIG. 5 is a cross-sectional view of a side of an LCD including a backlight unit according to an exemplary embodiment of the present invention.
Figure 6:
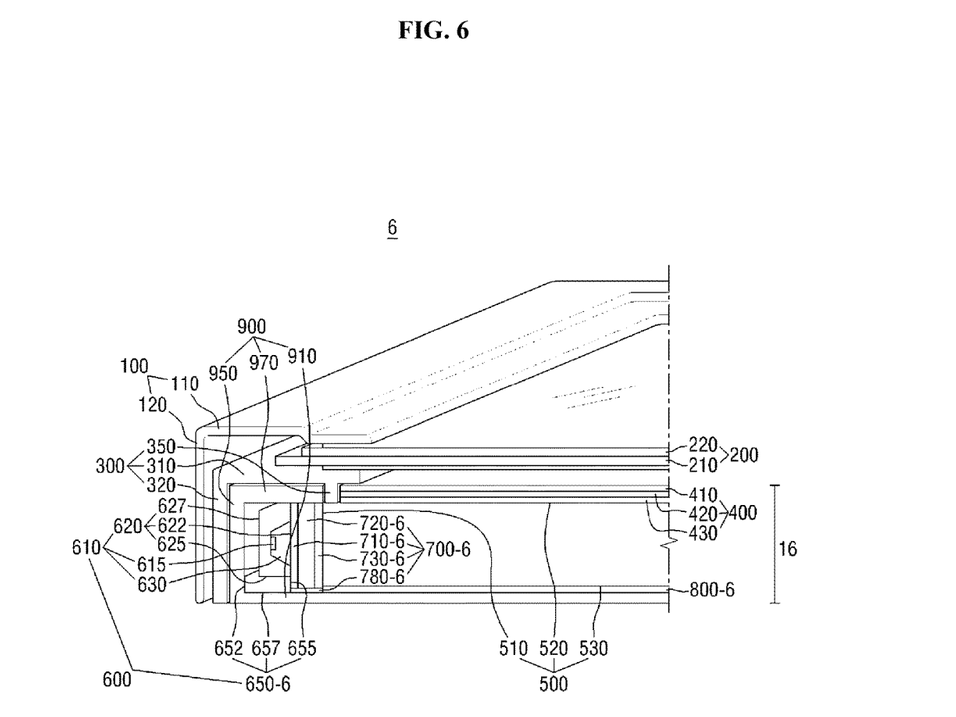
FIG. 6 is a cross-sectional view of a side of an LCD including a backlight unit according to an exemplary embodiment of the present invention.

FIGS. 5 and 6 are cross-sectional views of respective sides of LCDs 5 and 6 including backlight units 15 and 16 respectively, according to exemplary embodiments of the present invention.

Referring to FIGS. 5 and 6, each of the LCDs 5 and 6 may include a liquid crystal panel 200, an upper housing 100, and the backlight unit 15 or 16. Each of the backlight units 15 and 16 may include optical films 400, an LGP 500, a reflective sheet 800 or 800-6, a light source module 600-5 or 600-6, and a light control member 700-5 or 700-6. Repeated description of the substantially similar elements and operations illustrated with reference to FIGS. 1 and 2 will be omitted.

Each of the light control members 700-5 and 700-6 may include a reflection preventing layer 710-5 or 710-6 which is disposed adjacent to the light source module 600-5 or 600-6 and configured to prevent reflection of emitted light, a base substrate 720-5 or 720-6 which is disposed on the reflection preventing layer 710-5 or 710-6 and configured to scatter or diffuse light transmitting through the reflection preventing layer 710-5 or 710-6, and a light adjusting filter 730-5 or 730-6 which is disposed on the base substrate 720-5 or 720-6 and configured to filter out a particular wavelength of the scattered or diffused light. Each of the light control members 700-5 and 700-6 may be substantially similar to one of the light control members 700 and 700-4 described above with reference to FIGS. 2 and 4. Present exemplary embodiments will be described as having the light control member 700 of FIG. 2.

Referring to FIG. 5, the light source module 600-5 may be placed along an incident surface 510 (i.e., a side surface) of the LGP 500. In the light source module 600-5, light source packages 610-5 may be mounted on a PCB 650-5. According to the present exemplary embodiment, a resting surface 652 of the PCB 650-5 may be disposed on a sidewall 950 of a lower housing 900.

A side surface 657 of the PCB 650-5 may be in close contact with the reflective sheet 800 disposed on a bottom plate 910 of the lower housing 900. The other side surface 657 of the PCB 650-5 may be placed to contact the reflective sheet 800 disposed on a top plate 970 of the lower housing 900 or may be placed adjacent to the reflective sheet 800 depending on the shape of a long axis of the PCB 650-5. Referring to FIG. 5, the side surface 657 of the PCB 650-5 which contacts the reflective sheet 800 is disposed on the top plate 970 of the lower housing 900.

A mounting surface 655 may be formed opposite the resting surface 652 of the PCB 650-5 and may be placed to face the incident surface 510 of the LGP 500. The light source packages 610-5 may be placed on the mounting surface 655. Here, a lower surface 627 of a mold 620-5 of each of the light source packages 610-5 may be mounted on the mounting surface 655. A front (i.e., upper) surface 622 of the mold 620-5 may be placed to face the incident surface 510 of the LGP 500.

The light control member 700-5 may be placed in a gap between the front surface 622 of the mold 620-5 and the incident surface 510 of the LGP 500. The light control member 700-5 may include the reflection preventing layer 710-5, the base substrate 720-5, and the light adjusting filter 730-5. Repeated description of the substantially similar elements and operations illustrated with respect to FIG. 2 will be omitted. In the light control member 700-5, the reflection preventing layer 710-5, the base substrate 720-5, and the light adjusting filter 730-5 may be arranged as the exemplary embodiment illustrated with respect to FIG. 2 or FIG. 4.

The light control member 700-5 may be placed on the reflective sheet 800 partially exposed by the gap. According to the present exemplary embodiment, the light control member 700-5 may be attached onto the reflective sheet. To this end, an adhesive layer 780-5 may be placed on a surface of the light control member 700-5 which contacts the reflective sheet 800. Therefore, the light control member 700-5 may be attached to the reflective sheet 800 by the adhesive layer 780-5.

The adhesive layer 780-5 may be an optical clear adhesive (OCA) or an optical clear resin (OCR). Among light provided by the light source module 600-5, leaked light may be reflected by the reflective sheet 800, and the reflected light may transmit through the adhesive layer 780-5 formed of the OCA to propagate toward the light control member 700-5 or the LGP 500.

Since the light control member 700-5 is placed on the reflective sheet 800 formed on the bottom plate 910 of the lower housing 900, the light control member 700-5 may be more easily installed, and improve the installation/design freedom of the light control member 700-5.

Referring to FIG. 6, the light source module 600-6 may be placed along an incident surface 510 (i.e., a side surface) of the LGP 500. In the light source module 600-6, light source packages 610-6 may be mounted on a PCB 650-6. According to the present exemplary embodiment, the light source packages 610-6 may be placed on a resting surface 655 of the PCB 650-6 such that a front (i.e., upper) surface 622 of a mold 620 of each of the light source packages 610-6 lies in the same plane with a side surface 657 of the PCB 650-6. Therefore, the side surface 657 of the PCB 650-6 and the front surface 622 of the mold 620 may be brought into close contact with the light control member 700-6. Specifically, the side surface 657 of the PCB 650-6 and the front surface 622 of the mold 620 of each of the light source package 610-6 may be brought into close contact with the reflection preventing layer 710-6.

When the side surface 657 of the PCB 650-6 and the front surface 622 of the mold 620 are brought into close contact with the light control member 700-6, a gap between the light source module 600-6 and the light control member 700-6 may be minimized.

According to the present exemplary embodiment, the reflective sheet 800-6 may not be placed along an overlap area between a bottom plate 910 and a top plate 970 of a lower housing 900. Instead, the PCB 650-6 may be placed in the area where the reflective sheet 800-6 is not disposed. In addition, a resting surface 652 of the PCB 650-6 may be placed on the bottom plate 910 of the lower housing 900.

A gap may be formed between the incident surface 510 of the LGP 500 and the same plane in which the front surface 622 of the mold 620 and the side surface 657 of the PCB 650-6 lie. The light control member 700-6 may be placed on the bottom plate 910 of the lower housing 900 partially exposed by the gap. According to the present exemplary embodiment, the light control member 700-6 may be attached to the bottom plate 910 of the lower housing 900. To this end, the light control member 700-6 may include an adhesive layer 780-6 on a surface which contacts the bottom plate 910 of the lower housing 900. Therefore, the light control member 700-6 may be attached to the bottom plate 910 of the lower housing 900 by the adhesive layer 780-6.

When the side surface 657 of the PCB and the front surface 622 of the mold 620 lie in the same plane, and the same plane and the light control member 700-6 are brought into close contact with each other, the gap between the light source module 610-6 and the incident surface 510 of the LGP 500 may be minimized, thereby reducing the amount of light leaked. That is, light efficiency may be improved by minimizing light loss.

Figure 7:
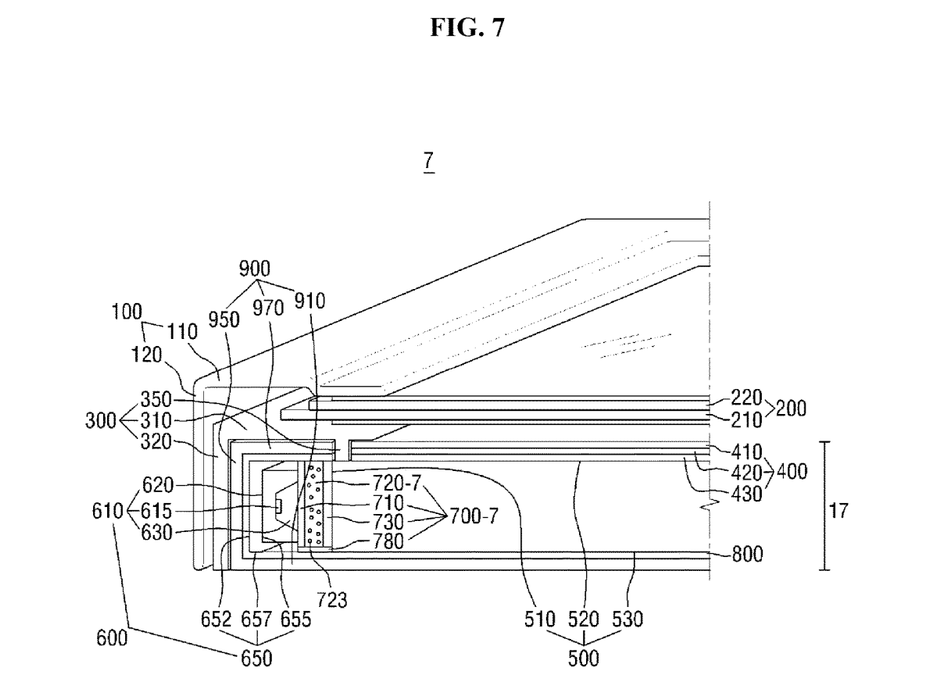
FIG. 7 is a cross-sectional view of a side of an LCD including a backlight unit according to an exemplary embodiment of the present invention.
Figure 8:
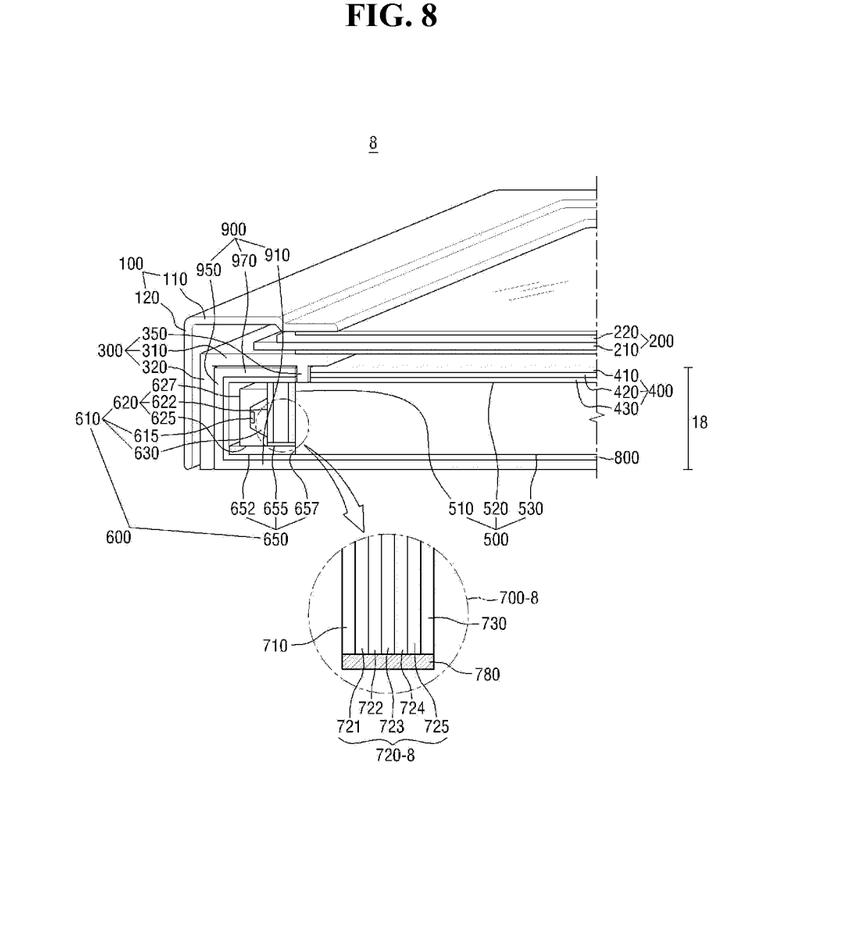
FIG. 8 is a cross-sectional view of a side of an LCD including a backlight unit according to an exemplary embodiment of the present invention.

FIGS. 7 and 8 are cross-sectional views of respective sides of LCDs 7 and 8 including backlight units 17 and 18 respectively, according to exemplary embodiments of the present invention.

Referring to FIGS. 7 and 8, each of the LCDs 7 and 8 may include a liquid crystal panel 200, an upper housing 100, and the backlight unit 17 or 18. Each of the backlight units 17 and 18 may include optical films 400, an LGP 500, a reflective sheet 800, a light source module 600, and a light control member 700-7 or 700-8. Repeated description of the substantially similar elements and operations illustrated with reference to FIGS. 1 and 2 will be omitted.

Each of the light control members 700-7 and 700-8 may include a reflection preventing layer 710 disposed adjacent to the light source module 600 and configured to prevent reflection of emitted light, a base substrate 720-7 or 720-8 disposed on the reflection preventing layer 710 and configured to scatter or diffuse light transmitting through the reflection preventing layer 710, and a light adjusting filter 730 disposed on the base substrate 720-7 or 720-8 and configured to filter out a particular wavelength of the scattered or diffused light. Each of the light control members 700-7 and 700-8 may be one of the light control members 700 and 700-4 described above with reference to FIGS. 2 and 4. Present exemplary embodiments will be described as having the light control member 700 of FIG. 2.

Referring to FIG. 7, when part of light emitted from a light source forms a bright portion, a hot spot phenomenon may occur in the backlight unit 17. The backlight unit 17 having the hot spot may prevent the bright/dark portion from being projected on the liquid crystal panel 200 by scattering or diffusing light that is provided to the LGP 500.

The base substrate 720-7 may include diffuser beads 723 configured to scatter or diffuse light. The diffuser beads 723 may be formed as beads or bubbles within the base substrate 720-7. The diffuser beads 723 may provide light with uniform luminance to the LGP 500 by scattering or diffusing light incident from the light source.

As described above, light scattered or diffused by the diffuser beads 723 of the base substrate 720-7 may be provided to the LGP 500 and the LCD 7 may provide an image with uniform luminance by preventing the hot spot phenomenon from occurring by using the base substrate 720-7. In addition, the diffuser beads 723 may block the transfer of heat to the LGP 500 by diffusing heat generated from the light source module 600.

Referring to FIG. 8, the base substrate 720-8 may include multiple layers. The base substrate 720-8 may include a stack of layers having gradually different refractive indices in a direction from the reflection preventing layer 710 towards the light adjusting filter 730. In the base substrate 720-8, a layer adjacent to the LGP 500 may have a refractive index similar to that of the LGP 500.

For example, when the LGP 500 has a refractive index of 1.5, a first layer 721 of the base substrate 720-8 adjacent to the reflection preventing layer 710 may include a material having a refractive index of 1.1, and a second layer 722 disposed on the first layer 721 may include a material having a refractive index of 1.2. In addition, a third layer 723 disposed on the second layer 722 may include a material having a refractive index of 1.3, and a fourth layer 724 disposed on the third layer 723 may include a refractive index of 1.4. A fifth layer 725 disposed on the fourth layer 724 may include a material having substantially the same refractive index as the LGP 500.

As described above, layers having gradually different refractive indices from that of the LGP 500 may be sequentially disposed, and the fifth layer 725 closest to the LGP 500 may be made of a material having a refractive index of 1.5, which may be equal or substantially equal to the refractive index of the LGP 500. Therefore, an amount of light reflected from different refractive index may be reduced. Alternatively, a thickness of the light control member 700-8 may be reduced by removing the fifth layer 725 to make the light control member 700-8 have a similar refractive index to that of the LGP 500. As a result, a thin-film structure may be implemented. Since reflected light generated due to a large difference in refractive index may be reduced, light loss may be reduced.

The multi-layer base substrate 720-8 in which refractive indices of the layers gradually decreases from the LGP 500 may prevent light leakage caused by a difference in refractive index, thereby increasing light efficiency of the backlight unit 18 and the LCD 8 including the same.

According to exemplary embodiments of the present invention, a light control member having a low-reflection function and a light adjusting filter may be placed in a space between a light source and an LGP. The light control member may eliminate the space between the LGP and the light source, thereby reducing the amount of light leaked and improving light efficiency.

According to exemplary embodiments of the present invention, the light control member placed between the light source and the LGP may include a base substrate configured to scatter or diffuse light. Therefore, the light control member may improve the uniformity of luminance using the base substrate.

According to exemplary embodiments of the present invention, the light control member placed between the light source and the LGP may include a light adjusting filter configured to absorb or reflect light of a particular wavelength. Therefore, the light control member may improve color reproducibility by using the light adjusting filter.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A backlight unit, comprising:
    a lower housing comprising a bottom plate;
    a light guide plate (LGP) disposed on the bottom pate;
    a light source module disposed on the bottom plate, the light source module disposed adjacent to an incident surface of the LGP and configured to irradiate light to the incident surface;
    a light control member disposed on the bottom plate, the light control member disposed between the light source module and the incident surface; and
    an adhesive layer disposed on the light control member,
    wherein the light control member comprises:
        a reflection preventing layer disposed adjacent to the light source module and configured to prevent reflection of light;
        a base substrate disposed on the reflection preventing layer and configured to scatter or diffuse light transmitted through the reflection preventing layer; and
        a light adjusting fitter disposed on the base substrate and configured to filter light comprising a first wavelength among light provided by the light source module,
    wherein the base substrate is disposed between the reflection preventing layer and the light adjusting filter,
    wherein a height of the reflection preventing layer, the base substrate, and the light adjusting filter are the same as each other,
    wherein a top surface of the reflection preventing layer, the base substrate, and the light adjusting filter are flush with each other,
    wherein the light control member includes a first surface facing the incident surface of the LGP, a second surface opposite to the first surface, a third surface facing the bottom plate, and a fourth surface opposite to the third surface, and
    wherein the adhesive layer directly contacts the third surface of the light control member.

2. The backlight unit of claim 1, wherein the light adjusting filter directly contacts the incident surface of the LGP.

3. The backlight unit of claim 1, wherein the adhesive layer contacts the light source module, the reflection preventing layer, the base substrate, the light adjusting filter, and the incident surface of the LGP.

4. The backlight unit of claim 1, wherein the reflection preventing layer comprises a reflectivity in a range of 0.1% to 1%.

5. The backlight unit of claim 1, wherein the base substrate further comprises diffuser beads.

6. The backlight unit of claim 1, wherein the base substrate comprises layers having different refractive indices from each other and disposed on the reflection preventing layer.

7. The backlight unit of claim 1, wherein:
the base substrate comprises layers having different refractive indices from each other; and
the layers are disposed on the reflection preventing layer such that the refractive indices of the layers gradually increase in a direction from the light source module towards the LOP.

8. The backlight unit of claim 7, wherein a first layer of the layers disposed adjacent to the LGP comprises a refractive index substantially equal to a refractive index of the LGP or different from the refractive index of the LGP by less than 0.1.

9. The backlight unit of claim 1, wherein the base substrate comprises glass, quartz, polymethyl methacrylate (PMMA), or polycarbonate (PC).

10. The backlight unit of claim 1, wherein the light adjusting filter is configured to minimize transmittance of light comprising the first wavelength.

11. The backlight unit of claim 1, wherein the light adjusting filter comprises a reflective mirror configured to reflect the first wavelength or an absorption filter configured to absorb the first wavelength.

12. The backlight unit of claim 1, wherein the light adjusting filter is configured to absorb or reflect light having the first wavelength in a range of 470 nm to 510 nm.

13. The backlight unit of claim 1, wherein the light adjusting filter is configured to absorb or reflect light having the first wavelength in a range of 560 nm to 610 nm.

14. The backlight unit of claim 1, wherein the lower housing further comprises:
sidewalls protruding upward from the bottom plate, and a top plate partially protruding from the sidewalls to be parallel to the bottom plate; and
a reflective sheet disposed between the LGP and the lower housing,
wherein the bottom plate of the lower housing comprises a space for housing the LGP, the light control member, and the light source module, and
wherein the light source module comprises a printed circuit board (PCB) and light source packages.

15. The backlight unit of claim 14, wherein the light control member is disposed on the PCB.

16. The backlight unit of claim 14, wherein the light control member is disposed on the lower housing.

17. The backlight unit of claim 14, wherein the PCB comprises:
a mounting surface on which the light source packages are disposed; and
a resting surface opposite to the mounting surface and disposed on a sidewall or the bottom plate of the lower housing.

18. A backlight unit, comprising:
a lower housing comprising a bottom plate;
a light source module disposed on the bottom plate, the light source module comprising a front surface configured to radiate light;
a light guide plate (LGP) disposed on the bottom plate, the light guide plate (LGP) comprising an incident surface upon which the light radiated from the front surface of the light source module is configured to be incident;
a light control member disposed on the bottom plate, the light control member disposed between the front surface of the light source module and the incident surface of the LGP; and
an adhesive layer disposed on the light control member, wherein:
the light control member contacts the front surface of the light source module and the incident surface of the LGP;
the reflection preventing layer contacts the front surface of the light source module;
the base substrate is disposed between the reflection preventing layer and the light adjusting filter;
a height of the reflection preventing layer, the base substrate, and the light adjusting filter are the same as each other;
a top surface of the reflection preventing layer, the base substrate, and the light adjusting filter are flush with each other;
the light control member includes a first surface facing the incident surface of the LGP, a second surface opposite to the first surface, a third surface facing the bottom plate, and a fourth surface opposite to the third surface; and
the adhesive layer directly contacts the third surface of the light control member.

19. The backlight unit of claim 18, wherein
the light adjusting filter or the base substrate contacts the incident surface of the LGP.

20. A liquid crystal display (LCD), comprising:
a backlight unit comprising a lower housing comprising a bottom plate, a light guide plate (LGP) disposed on the bottom plate, a light source module disposed on the bottom plate, the light source module disposed adjacent to an incident surface of the LGP and configured to irradiate light to the incident surface, a light control member disposed on the bottom plate, the light control member disposed between the light source module and the incident surface, and an adhesive layer disposed on the light control member; and
a liquid crystal panel disposed on the LGP,
wherein the light control member comprises:
a reflection preventing layer disposed adjacent to the light source module and configured to prevent reflection of light;
a base substrate disposed on the reflection preventing layer and configured to scatter or diffuse light transmitted through the reflection preventing layer; and
a light adjusting filter disposed on the base substrate and configured to filter light comprising a first wavelength among light provided by the light source module,
wherein the base substrate is disposed between the reflection preventing layer and the light adjusting filter,
wherein a height of the reflection preventing layer, the base substrate, and the light adjusting filter are the same as each other,
wherein a top surface of the reflection preventing layer, the base substrate, and the light adjusting filter are flush with each other,
wherein the light control member includes a first surface facing the incident surface of the LGP, a second surface opposite to the first surface, a third surface facing the bottom plate, and a fourth surface opposite to the third surface, and wherein the adhesive layer directly contacts the third surface of the light control member.

* * * * *